(12) United States Patent
Ervin et al.

(10) Patent No.: US 7,580,417 B2
(45) Date of Patent: Aug. 25, 2009

(54) METHOD AND APPARATUS FOR LOAD BALANCING OVER VIRTUAL NETWORK LINKS

(75) Inventors: Jimmy Ervin, Raleigh, NC (US); Mike Takefman, Nepean (CA); Praveen Bhagwatula, Cary, NC (US); James Alexander, Raleigh, NC (US); Steven Faulkner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 11/500,732

(22) Filed: Aug. 7, 2006

(65) Prior Publication Data

US 2008/0031263 A1    Feb. 7, 2008

(51) Int. Cl.
 *H04L 12/56*    (2006.01)
(52) U.S. Cl. ...................................................... 370/397
(58) Field of Classification Search ................. 370/230, 370/235, 395.21, 395.4, 395.41
See application file for complete search history.

(56) References Cited

U.S. PATENT DOCUMENTS

| 5,432,783 | A  | * | 7/1995  | Ahmed et al. ............... 370/397 |
| 5,550,816 | A  | * | 8/1996  | Hardwick et al. ........... 370/397 |
| 6,590,861 | B1 | * | 7/2003  | Vepa et al. .................. 370/216 |
| 6,775,235 | B2 | * | 8/2004  | Datta et al. ................. 370/238 |
| 6,778,498 | B2 | * | 8/2004  | McDysan .................... 370/231 |
| 7,145,878 | B2 | * | 12/2006 | Katz ........................... 370/238 |

* cited by examiner

*Primary Examiner*—Edan Orgad
*Assistant Examiner*—Blanche Wong (57) ABSTRACT

Techniques for load balancing network traffic over virtual point-to-point data links at a data-link layer include determining a particular group of virtual point-to-point data links that reach a particular local area network of one or more network nodes. A particular data-link address for a particular node of the particular local area network is associated with each virtual point-to-point data link of the particular group. When a data packet is received that includes data that indicates the particular data-link address as a destination; one virtual point-to-point data link of the group is determined to balance traffic among the group. The data packet is sent only over the one virtual point-to-point data link. These techniques enable virtual point-to-point data links through two or more intermediate network nodes, such as a pair of provider edge nodes, to be bundled for load balancing purposes.

23 Claims, 6 Drawing Sheets

METHOD AND APPARATUS FOR LOAD BALANCING OVER VIRTUAL NETWORK LINKS

BACKGROUND OF THE INVENTION

1. Field of the Invention

The present invention relates to load balancing for networks with bundles of communication links between one network device and at least one pair of different network devices, such as a pair of provider edge nodes through which customer networks are connected to a provider network, such as a metropolitan area network (MAN).

2. Description of the Related Art

Networks of general purpose computer systems and special purpose devices connected by external communication links are well known and widely used in commerce. The networks often include one or more network devices that facilitate the passage of information between the computer systems and special purpose devices. A network node is a network device or computer system or other special purpose device connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information to be processed, often independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The protocol in the payload is said to be encapsulated in the protocol of the header. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The physical layer protocol identifies the physical media used to communicate with another device. The data-link protocol identifies a different node connected by the physical media to a particular node.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

Routers and switches are network devices that determine which communication link or links to employ to support the progress of packets through the network. For example, Ethernet switches forward packets according to the Ethernet protocol at layer 2 based on unique identifiers for each device connected. Some current routers implement sophisticated algorithms that provide high performance forwarding of packets based on combining layer 2 and layer 3 header information, or some other combination, and knowledge of network topology beyond the adjacent nodes.

As used here, a port is a physical interface on a network device that is, or can be, connected to a cable to serve as a communication link with a port on another network device. For example, three types of widely used Ethernet ports have three different bandwidths of 100 Megabits per second (Mbps, where 1 Megabit=$10^6$ binary digits called bits), 1 Gigabit per second (Gbps, where 1 Gigabit=$10^9$ bits), or 10 Gbps. These three ports and links are termed Fast Ethernet, Gigabit Ethernet and 10 Gigabit Ethernet, respectively. Optical metropolitan area networks (MANs) and wide area networks (WANs) have been developed using special optical ports on nodes that repeat and switch optical signals, correcting for attenuation and other signal degradation. Optical protocols for these networks include a Synchronous Optical Network (SONET), Synchronous Digital Hierarchy (SDH) and Optical Transport Network (OTN) protocols.

In some circumstances, such as for redundancy or to provide needed bandwidth, some networks bundle multiple communication links between a pair of network nodes. For example, if network traffic between a particular server and an Ethernet switch in an office building needs bandwidth up to 500 Mbps, then it might be more cost-effective to connect five Fast Ethernet ports on each device rather than to install a Gigabit Ethernet port on each device and string a single Gigabit cable in the walls between them. Also the five Fast Ethernet links provide device resiliency against hardware failure on one port or link. The five Fast Ethernet links in this example constitute a bundle of communication links. Link Aggregation Control Protocol (LACP) is part of an IEEE specification (802.3ad) that allows several physical ports to be bundled together to form a single logical channel. LACP allows a switch to negotiate an automatic bundle by sending LACP packets to the adjacent node.

Bundled communication links are commercially available. For example bundled Ethernet links are available from Cisco Systems, Inc. of San Jose, Calif. as ETHERCHANNEL™ capabilities on Ethernet switches and routers. As another example, one of the two connected devices bundle the links into a group for redundancy using FLEXLINK. Bundled links are also available on routers for use with SONET for optical communication links as part of packet over SONET (POS) technology from Cisco Systems.

A load-balancing process is used on the sending network node of the pair connected by a bundle of communication links for the purpose of determining which communication link to use for sending one or more data packets to the receiving network node of the pair. A goal of load-balancing is to prevent one link from being heavily utilized to the point of congestion, while one or more other links in the bundle are under-utilized. Current balancing algorithms use a variety or methods to associate data packets with a specific port in a set of ports connected to the communication links in the bundle. Typically, information in a header portion of a data packet is used to derive a value that is associated with one port of the set, often using a hash function to make the association. The algorithm is designed to generate a value in a range of values that are associated with the full set of ports. Thus data packets directed to the receiving node are distributed over all communication links in the bundle by the load balancing process. Many load-balancing processes are designed so that all data packets in the same data flow are sent through the same port.

As more enterprises access wider metropolitan area networks for communication with remote sites, the enterprise procures service from a service provider for access to a MAN and WAN. The enterprise equipment is connected to service provider equipment at the edge of the service provider network. It is common for a service provider to provide a pair of so called edge nodes at the service provider edge so that service to the customer is not interrupted if one device fails.

Data packets are transferred across the provider network using virtual point-to-point links, so that traffic from one customer is not seen by other customers using the provider network. Such virtual point-to-point links appear to end users to be direct connections, but in fact may involve multiple intermediate network nodes. Virtual point-to-point links at layer 2 (data-link layer) also called pseudowires (PW) are available in a variety of protocols for a variety of different physical media. Such protocols include Multi-Protocol Label switching (MPLS), shared packet rings, and resilient packet ring (RPR) protocol for use over Ethernet media as well as optical media. Other protocols include MAC-in-MAC and Generic Routing Encapsulation (GRE) tunnels for Ethernet media. One or more pseudo wires are collected to form a virtual local area network (VLAN) or a virtual private network (VPN).

Virtual point-to-point links through the pair of devices on a provider edge provide redundancy in case of failure of either device using available processes, such as Spanning Tree or Back-Up PW. However, no previously known processes provide load balancing among data-links from one device to two or more other intermediate network nodes, such as the pair of provider edge nodes. Thus the capability to load-balance traffic from remote sites across the pair of provider edge nodes is not made available. As a result, one link or link-bundle between the customer device and one provider edge node may become congested while one or more links or link-bundles of a different provider edge node to the same customer network are under-utilized.

Based on the foregoing, there is a clear need for a load-balancing process for data-links distributed across the pair of provider edge nodes. In general, there is a need for a load-balancing process for data links to a given node when the data links are distributed across two or more different intermediate network nodes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for balancing of data packet traffic loads over a virtual link bundle in a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The invention is described in the following sections in the context of load balancing layer 2 virtual links over an optical ring using RPR protocol to create loop-free virtual point-to-point links between pairs of provider edge nodes. However, the invention is not limited to this context. In other embodiments, different layer 2 virtual point-to-point links are bundled, such as links using MPLS, MAC-in-MAC and a GRE tunnel protocols, among others. In other embodiments, virtual point-to-point links that pass through two or more different nodes at or away from the provider edge are bundled for load balancing. In some embodiments, the virtual point-to-point links bundled for load balancing are also grouped for redundancy to protect against device failure at one or more nodes.

1.0 Network Overview

Figure 1A:
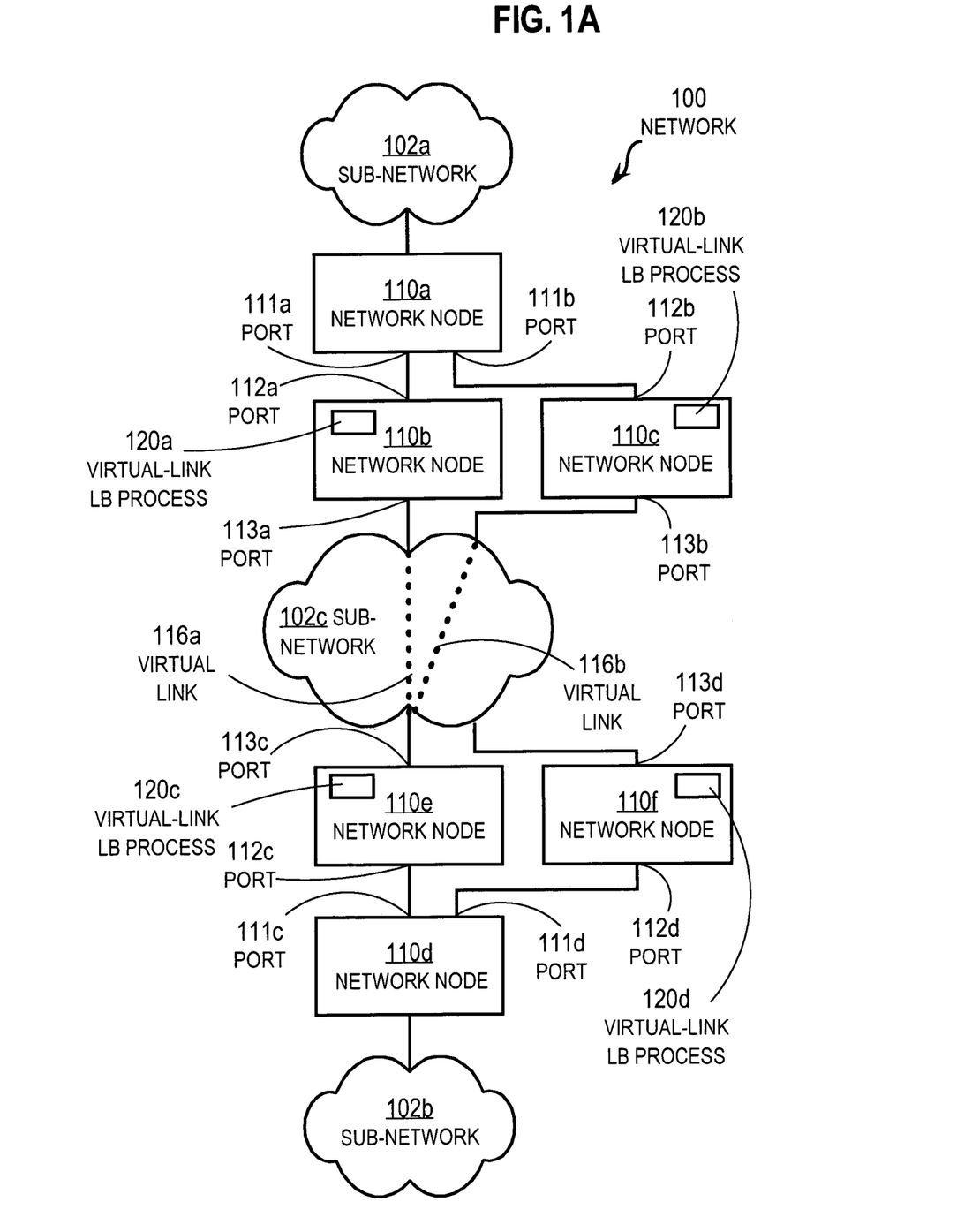
FIG. 1A is a block diagram that illustrates a network that includes a bundle of virtual point-to-point links, according to an embodiment.

FIG. 1A is a block diagram that illustrates a network 100 that includes a bundle of virtual point-to-point links, according to an embodiment. A computer network is a geographically distributed collection of interconnected sub-networks (e.g., sub-networks 102a, 102b, 102c collectively referenced hereinafter as sub-networks 102) for transporting data between network nodes (e.g., network nodes 110a, 110b, 110c, 110d, 110e, 110f, 110g, collectively referenced hereinafter as network nodes 110). A local area network (LAN) is an example of such a sub-network 102. A metropolitan area network (MAN) and wide area network (WAN) are further examples of such sub-networks. The network's topology is defined by an arrangement of end nodes that communicate with one another, typically through one or more intermediate network nodes such as a router or switch, which facilitates transmitting data between end nodes. As used herein, an end node is a node that is configured to originate or terminate communications over the network. In contrast, an intermediate network node facilitates the passage of data between end nodes. In FIG. 1, the network nodes 110 are all intermediate nodes. In other embodiments, such as embodiments without sub-networks 102a, 102b, one or more network nodes, e.g. nodes 110a, 110d, are end nodes. Each sub-network 102 includes zero or more intermediate network nodes.

Each network node 110 includes two or more physical ports, such as port 111a and port 111b on network node 110a; port 112a and port 113a on network node 110b; port 112b and port 113b on network node 110c; port 112c and port 113c on network node 110e; port 112d and port 113d on network node 110f; and port 111c and port 111d on network node 110d. The ports are connected by communication links. Each physical port and physical communication link can carry one or more logical links, also called virtual links. A virtual link is a subset of all data packets that traverse a physical link. The members of the subset are associated by some virtual link identifier, such as a virtual LAN (VLAN) tag supported by Ethernet network nodes, carried in a header or payload portion of the appropriate protocol.

A network topology as illustrated in FIG. 1 is useful in many example scenarios. For example, in one embodiment, sub-network 102c is a MAN using an optical physical layer, while sub-networks 102a, 102b are Ethernet LANs that belong to an enterprise at two different sites in the metropolitan area served my sub-network 102c. The network node 110a connects the LAN represented by sub-network 102a to two network nodes 110b, 110c that serve as a pair of provider edge nodes for provider sub-network 102c. Similarly, the network node 110d connect the LAN represented by sub-network 102b to two network nodes 110d, 110e that serve as a pair of provider edge nodes for provider sub-network 102c.

It is assumed for purposes of illustration that ports 111a, 111b, 111c, 111d (collectively referenced hereinafter as ports 111) and that ports 112a, 112b, 112c, 112d (collectively referenced hereinafter as ports 112) are Fast Ethernet ports. It is further assumed that ports 113a, 113b, 113c, 113d (collectively referenced hereinafter as ports 113) are optical ports for connection to an optical ring. It is further assumed that sub-network 102c is an optical network, such as an optical ring using the SONET protocol.

Data link layer protocols are used to identify to each network node 110a different network node 110 connected at a port of the network node. For example, the Ethernet layer 2 protocol identifies to network node 110b that port 111a of network node 110a with a unique media access control (MAC) number is connected via the link at port 112a. Similarly, the Ethernet layer 2 protocol identifies to network node 110a that port 112a of network node 110b with a different MAC number is connected via the link at port 111a.

To traverse the provider sub-network 102c that is a MAN or WAN, data link protocols, like Ethernet layer 2, and payloads are encapsulated by the provider edge nodes in a point-to-point protocol, such as MPLS. The point-to-point protocol ensures that a data packet received from a first port on a first node is communicated only to a second port on a second node and to no other port on that node or any other node outside the provider edge. This path through the sub-network 102c between the two particular nodes is called a pseudo wire. Configuration data is used to define the two ports that are connected by the point-to-point link and provide a unique label to be included in the point-to-point protocol header of data packets traversing the sub-network 102c, including provider edge network nodes 110b, 110c, 110d, 110e.

In the illustrated embodiment, one virtual point-to-point link (called a pseudo wire) of the point-to-point protocol serves as a virtual link 116a between port 111a on node 110a and port 111c on node 110d. A second virtual link 116b connects port 111b on node 110a and port 111c on node 110d. The portions of the virtual links 116a, 116b through network 102c are shown as dashed lines.

Similarly, other virtual links may be defined to provide more connectivity among the customer network nodes. For example, two more virtual links (not shown) are often established between the ports 111a and 111b on node 110a to port 111d on node 110d, through provider edge network node 110f. The collection of these two virtual links and virtual links 116a, 116b may constitute a virtual private network (VPN). In some embodiments, a VLAN is established. In a VLAN all ports on the VLAN see all traffic with the other ports on the VLAN. To complete a VLAN for ports 111, two additional virtual links (not shown) are established in sub-network 102c; a first between ports 111a and 111b connecting port 113a and port 113b, and a second between ports 111c and 111d connecting port 113c and 113d.

Embodiments of the invention may be demonstrated using virtual link 116a and virtual link 116b alone. Therefore other virtual links in a VPN or VLAN are not shown in FIG. 1, in order to avoid obscuring the invention.

2.0 Structural Overview

According to the illustrated embodiment, the provider edge nodes 110b, 110c, 110e, 110f include virtual link load balancing (LB) processes 120a, 120b, 120c, 120d, respectively (collectively referenced hereinafter as virtual link LB processes 120). In other embodiments more or fewer network nodes 110 include a virtual link LB process 120. As described in more detail below, the virtual link LB process (e.g., process 120c) bundles two or more virtual links (e.g., virtual links 116a, 116b) that pass through two or more different intermediate network nodes (e.g., provider edge nodes 110b and 110c) to the same LAN (e.g., sub-network 102a) of one or more network nodes (e.g., node 110a). This provides load balancing of traffic through the two or more different intermediate network nodes that reach the same LAN, for which load balancing is not available in the prior art.

Figure 1B:
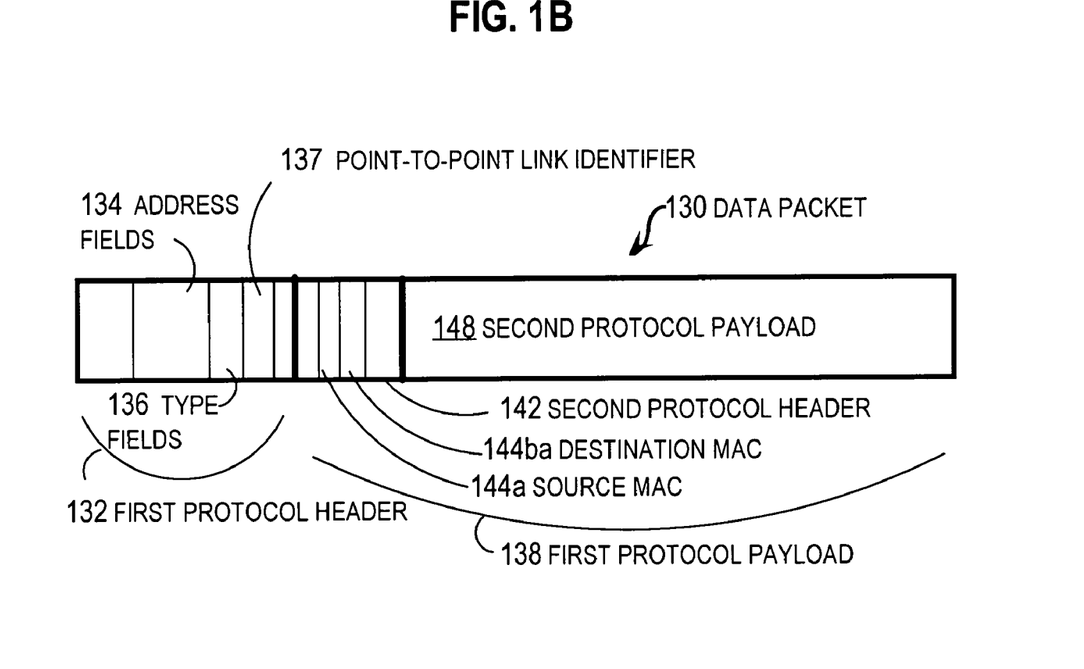
FIG. 1B is a block diagram of a data packet transmitted over virtual point-to-point links.

In an illustrated embodiment, the virtual load balancing bundle identifier is configured on the network nodes. In some embodiments, an identifier for the virtual load balancing bundle of virtual links is included in a header for the point to point protocol. FIG. 1B is a block diagram that illustrates a packet 130 communicated over a network, such as network 100. Packet 130 includes payloads 138, 148, each encapsulated by at least one network header, e.g., headers 132, 142, respectively. Each header 132, 142 is formatted in accordance with a network communication protocol; header 132 is formatted according to a first protocol and header 142 is formatted according to a second protocol. The header 142 for the second protocol is included within the payload 138 of the first protocol. The header for a protocol typically includes type fields that identify the protocol to which the header belongs and the next protocol in the payload, if any. For example, the header 132 for the first protocol includes type fields 136. The header for a protocol often includes a destination address or a source address, or both, for the information in the payload. For example, the header 132 for the first protocol includes address fields 134 where the source and receiver address for the first protocol is located within the packet 130.

In the illustrated embodiment, the first protocol is a point-to-point protocol and first protocol header 132 includes a point-to-point link identifier field 137. In some embodiments, the first protocol header 132 also includes a LB bundle affiliation field 138, that identifies this virtual link as a member of a group for load balancing.

In the illustrated embodiment, the second protocol header 142 is a data-link layer header, such an Ethernet layer 2 header. This header includes a source MAC field 144a that holds data that indicates the MAC number of the port that is a source of the packet and a destination MAC field 144b that holds data that indicates the MAC number of the port that is a destination of the packet. In such embodiments, the MAC numbers serve as data-link layer addresses for source and destination. The first protocol header 132 is a header for a point to point protocol used in sub-network 102c, such as a RPR header, a MPLS header, a GRE header, or MAC-in-MAC header. The point-to-point header includes field 137 that indicates the virtual link, e.g., by a MPLS label or a VLAN identifier.

Although fields are shown as contiguous blocks of data in a particular order in FIG. 1B for purposes of illustration, in various embodiments one or more fields or portions thereof are included in the data packet in a different position or order or both.

According to some embodiments of the invention, the virtual link LB processes 120 include a data structure used to associate data link addresses (such as MAC addresses) with physical and virtual links.

Figure 4:
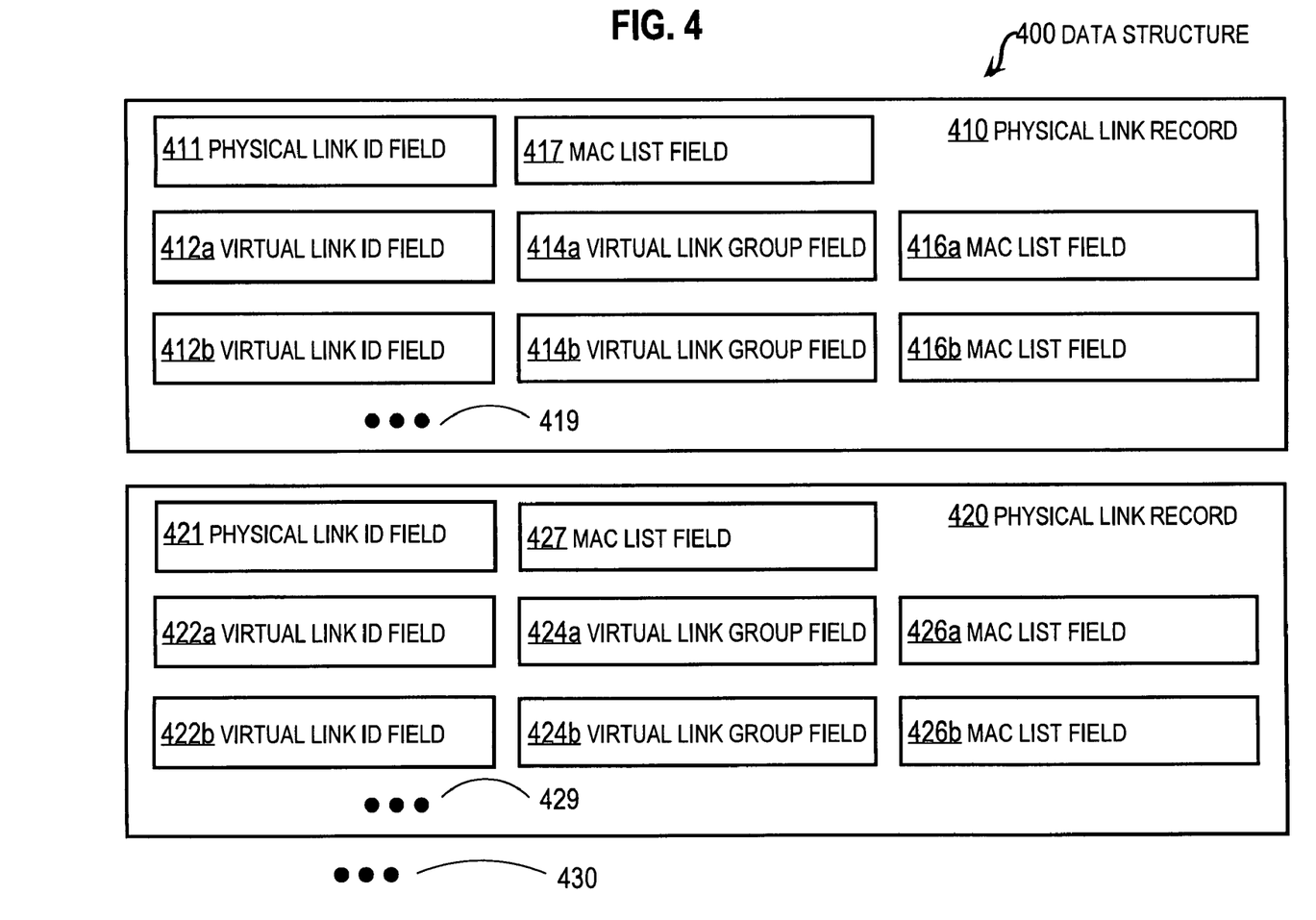
FIG. 4 is a block diagram that illustrates a data structure for storing information about bundles of virtual point-to-point links, according to an embodiment.

FIG. 4 is a block diagram that illustrates a data structure 400 for storing information about bundles of virtual point-to-point links, according to an embodiment. The data structure is stored in one or more portions of memory as part of LB process 120. Although fields are shown as contiguous blocks in a particular order in a contiguous portion of memory for purposes of illustration, in other embodiments, one or more fields or portions thereof are stored in a different order or location in memory and associations are provided by pointers.

In the illustrated embodiment, the data structure 400 includes a record for each physical port on the network node, such as physical link record 410, physical link record 420, and additional physical link records indicated by ellipsis 430 (collectively referenced hereinafter as physical link record 410). Each physical link record 410 includes a physical link identifier field 411, 421, and others, respectively, (collectively referenced hereinafter as physical link ID field 411) that uniquely identifies the port on the network node, such as a MAC address for the port. Each physical link record 410, 420 also includes a MAC list field 417, 427, respectively, (collectively referenced hereinafter as MAC list field 417) that lists the MAC addresses that have appeared on the link to that port. In other embodiments, the MAC addresses are stored in a separate data structure and simply point to the physical link ID field (e.g., fields 411, 421) that they are associated with.

As used in a method described below, each physical link record 410 in the data structure 400 also includes a virtual link ID field for every virtual link that passes through that port. The virtual link is identified in this field in any manner known in the art. For example, the virtual link is identified in this field by a VPN name and virtual circuit number. As depicted in data structure 400, physical link record 410 includes virtual link ID fields 412a, 412b and additional virtual link ID fields indicated by ellipsis 419. Similarly, physical link record 420 includes virtual link ID fields 422a, 422b and additional virtual link ID fields indicated by ellipsis 429. Virtual link ID fields 412a, 412b, 422a, 422b and additional virtual link ID fields indicated by ellipses 419 and 429 are collectively referenced hereinafter as virtual link ID field 412. If there are no virtual links using a port then, in various embodiments, virtual link ID field 412 for the record 410 is empty or omitted.

Associated with each virtual link ID field 412a, 412b, 422a, 422b and additional fields indicated by ellipses 419 and 429 is a virtual link group field 414a, 414b, 424a, 424b, and additional fields indicated by ellipses 419 and 429 respectively. Virtual link group fields 414a, 414b, 424a, 424b and additional virtual link ID fields indicated by ellipses 419 and 429 are collectively referenced hereinafter as virtual link group field 414. This virtual link group field 414 is used to hold data that indicates a group of virtual links that are bundled together for load balancing purposes, if any. For example, if physical link ID field 411 of record 410 holds data that indicates port 113c, then virtual link ID fields 412a, 412b, and others indicated by ellipsis 419 hold data that indicates virtual links 116a, 116b, and others such as a virtual link between ports 111c and 111d, through ports 113c and 113d. In this example, the data in virtual link group field 414a and 414b for virtual links 116a and 116b, respectively, hold data that indicates group X to which those virtual links belong for load balancing purposes. If the virtual link is not associated with any group for load balancing purposes, then, in various embodiments, the associated virtual link group field is empty or omitted.

Also associated with each virtual link ID field 412a, 412b, 422a, 422b and additional fields indicated by ellipses 419 and 429 is a virtual link MAC list field 416a, 416b, 426a, 426b and additional fields indicated by ellipses 419 and 429, respectively. Virtual link MAC list fields 416a, 416b, 426a, 426b and additional virtual link MAC list fields indicated by ellipses 419 and 429 are collectively referenced hereinafter as virtual link MAC list field 416. This virtual link MAC list field 416 lists the MAC addresses that have appeared on the virtual link identified in the corresponding virtual link ID field. In other embodiments, the MAC addresses are stored in a separate data structure and simply point to the virtual link ID field 412 that they are associated with.

3.0 Method for Balancing Traffic Load

Figure 2:
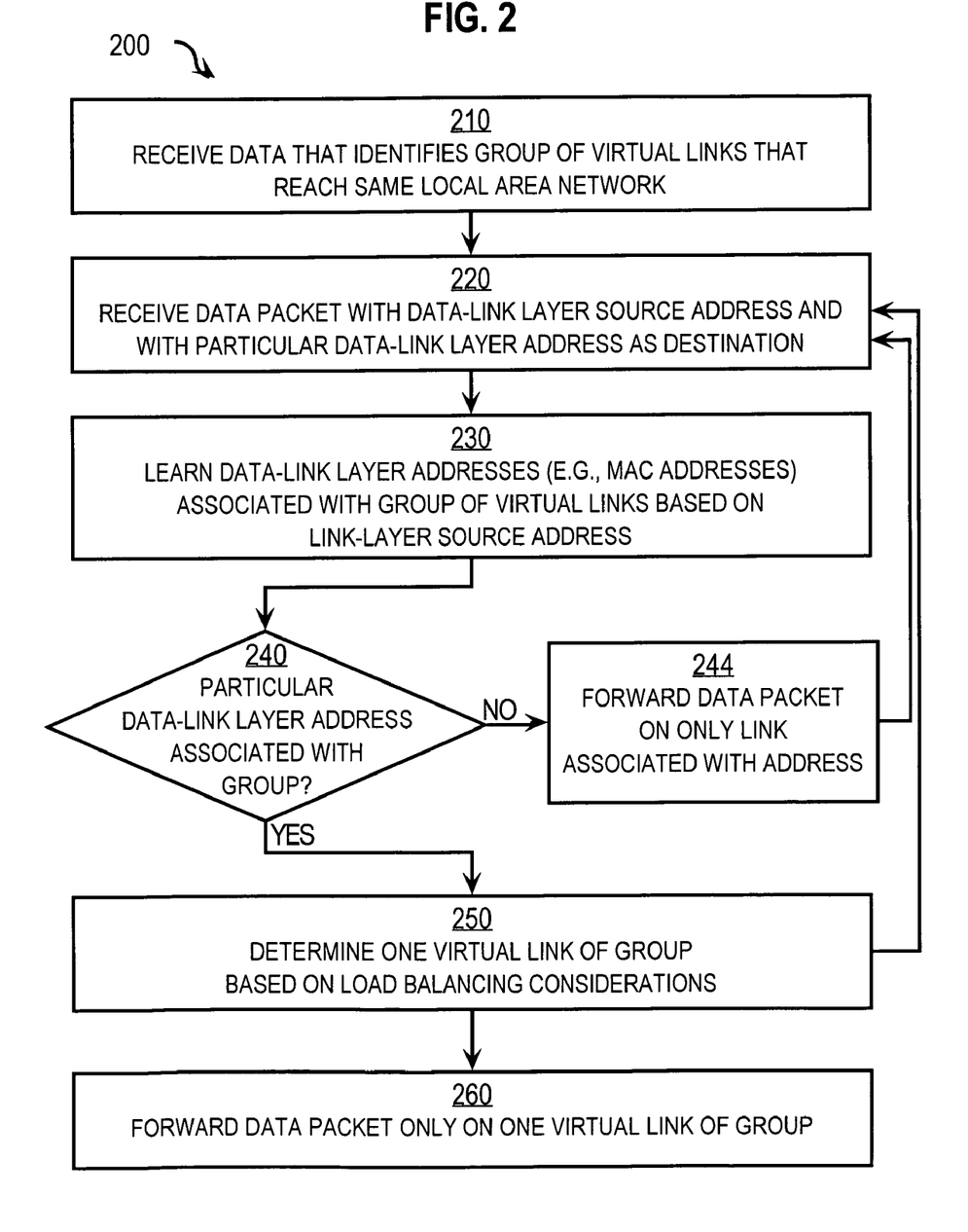
FIG. 2 is a flow diagram that illustrates at a high level a method for balancing traffic load on a bundle of virtual point-to-point links, according to an embodiment.

FIG. 2 is a flow diagram that illustrates a method 200 at a LB process 120 for balancing data packet traffic load over links from multiple nodes, according to an embodiment. Although steps are shown in FIG. 2 and subsequent flow diagram FIG. 3 in a particular order for purposes of illustration, in other embodiments one or more steps are performed in a different order or overlapping in time or are omitted, or changed in some combination of ways.

In step 210, data is received that identifies a group of virtual links that reach the same local area network. This group can be bundled for load balancing of traffic to the local area network, as well as for redundancy. Any method known in the art may be used to receive this data. In some embodiments, one or more groups are predefined and stored within source code or in files stored with the executable code or in files or a database accessible to the LB process 120. In some embodiments, a network administrator inputs a group identifier and a list of virtual links that are members of the group either in response to prompts from the LB process 120 or independently of prompts. In some embodiments, the group is defined when the virtual links are configured. In some embodiments, the group data is included in a message sent to the LB process 120 from a process on a different node. For example, in some embodiments, each node where virtual links converge (e.g., network node 110d) identifies some or all of those converging virtual links as members of a group to be bundled for load balancing purposes and sends a control plane message along the virtual links identifying those virtual links as members of a group to be bundled for load balancing purposes. The LB process 120 in each intermediate network node that receives this control plane message (e.g., LB process 120c) thus receives the data that defines the group during step 210.

For example, in some embodiments the RPR protocol is extended to include a new attribute 138 that holds data that indicates group (i.e., an LB bundle affiliation) for the data link encapsulated by the RPR header.

It is assumed for purposes of illustration that virtual link 116a and virtual link 116b are two virtual links among six virtual links in a VLAN that connects sub-network 102a of a company to sub-network 102b of the same company. It is further assumed that only virtual link 116a and virtual link 116b of the VLAN are affiliated with Group X, bundled for load balancing. The affiliation of virtual links 116a and 116b with group X is determined based on data received during step 210. Any method may be used to affiliate the virtual links with a group. In an illustrated embodiment, the virtual links are affiliated using one or more linked data structures, such as data structure 400. As a result of step 210, in this embodiment, multiple virtual links identified in virtual link ID field 412 are associated with a group of virtual links (such as Group X) that are bundled for load balancing purposes by virtue of data indicating the Group, if any, in virtual link group field 414. For example, data indicating virtual links 116a, 116b is stored in virtual link ID fields 412a, 412b, respectively; and data indicating Group X is stored in virtual link group fields 414a, 414b, respectively, as a result of step 210.

In step 220, data packets are received by the LB process 120. For example, in switches and routers, data packets are received at one port, stored in part or in whole temporarily into memory, and then forwarded through the same or different port. During step 220, the LB process 120 inspects the packet data to obtain the data-link address (e.g., the MAC number) for the source port and destination port. If the port receiving the packet does not have the MAC number in the destination address, then the packet is forwarded over one or more other ports without processing at the local node. In some embodiments the destination port is not specified, but the field 144b holds a special code, and the data packet is a broadcast to be processed by every node that receives it. Normal processing of data packets at the data link layer is well known in the art and not described further here.

It is assumed for purposes of illustration that many data packets initiated by a network node (not-shown) with MAC address A in sub-network 102a are received at network node 110e. Some of these data packets are transported over virtual link 116a, and some over virtual link 116b, each with MAC address A in the source address field 144a.

In step 230, the data-link addresses associated with a group of virtual links are learned based on the source addresses in the received data packets. For example, MAC source addresses associated with every virtual link affiliated with a particular bundle are learned during step 230. Step 230 is described in more detail below with reference to FIG. 3 and data structures described with reference to FIG. 4. For example MAC address A is stored in virtual link MAC list fields 416a, and 416b during step 230 as a result of finding MAC address A as a source in one or more data packets received over each of virtual links 116a, 116b. In prior art approaches, a MAC address is associated with only one virtual link at any given time, but not with a virtual link bundle. As an example, if the MAC address A first appears on virtual link 116a, it is associated with virtual link 116a. If the same MAC address A now appears on virtual link 116b, the association of MAC address A with virtual link is 116a is removed and a new association of MAC address A with virtual link 116b is created.

In step 240, it is determined whether the destination data-link address is associated with a group of virtual links bundled for load balancing. It is assumed for purposes of illustration that at some time after process 120c on network node 110e learns that MAC address A is associated with multiple virtual links 116a, 116b, then network node 110e receives a data packet from network node 110d with a destination MAC address A. By reference to data structure 400, it is determined that field 416a holds data that indicates MAC address A and is associated with field 414a that holds data that indicates Group X. Thus, it is determined that the destination address is associated with a group bundled for load balancing.

If the destination data-link address is not associated with a group of virtual links bundled for load balancing, then control passes to step 244. In step 244, the data packet is forwarded on the only port associated with the destination MAC. Step 244 is routinely followed in prior art approaches. Control then passes back to step 220 to receive the next data packet.

However, if it is determined in step 240 that the destination data-link address is associated with a group of virtual links bundled for load balancing, then control passes to step 250. In step 250 only one virtual link in the group of virtual links bundled for load balancing is selected to receive the data packet.

For example, during step 240, it is determined that destination MAC address A is associated with Group X, and control passes to step 250. In step 250 one virtual link in the Group X is selected based on load balancing considerations. It is assumed for purposes of illustration that virtual link 116a has been relatively heavily used, so that during step 250 virtual link 116b is selected.

In step 260, the data packet is forwarded to the destination using the selected virtual link and no other. For example, the data packet is forwarded to network node with MAC address A in sub-network 102a over virtual link 116b. Virtual link 116a is not used even though it is also associated with the MAC address A.

In some embodiments, a broadcast or multicast that would normally be sent over all virtual links, is found in step 240 to be associated with the group (e.g., group X) and control passes to step 250 to select only one virtual link in the group. Control then passes to step 260 to send the broadcast or multicast only over the selected virtual link among the Group. The data packet is also sent to one member of other groups, and to all virtual links that are not members of groups bundled for load balancing. Thus, if link 116b is selected, the multicast is sent over virtual link 116b but not over virtual link 116a. Once the multicast or broadcast is received at the remote sub-network, that sub-network may enforce any procedure to keep from sending the same broadcast or multicast packet repeatedly to the same node that has received it.

Figure 3:
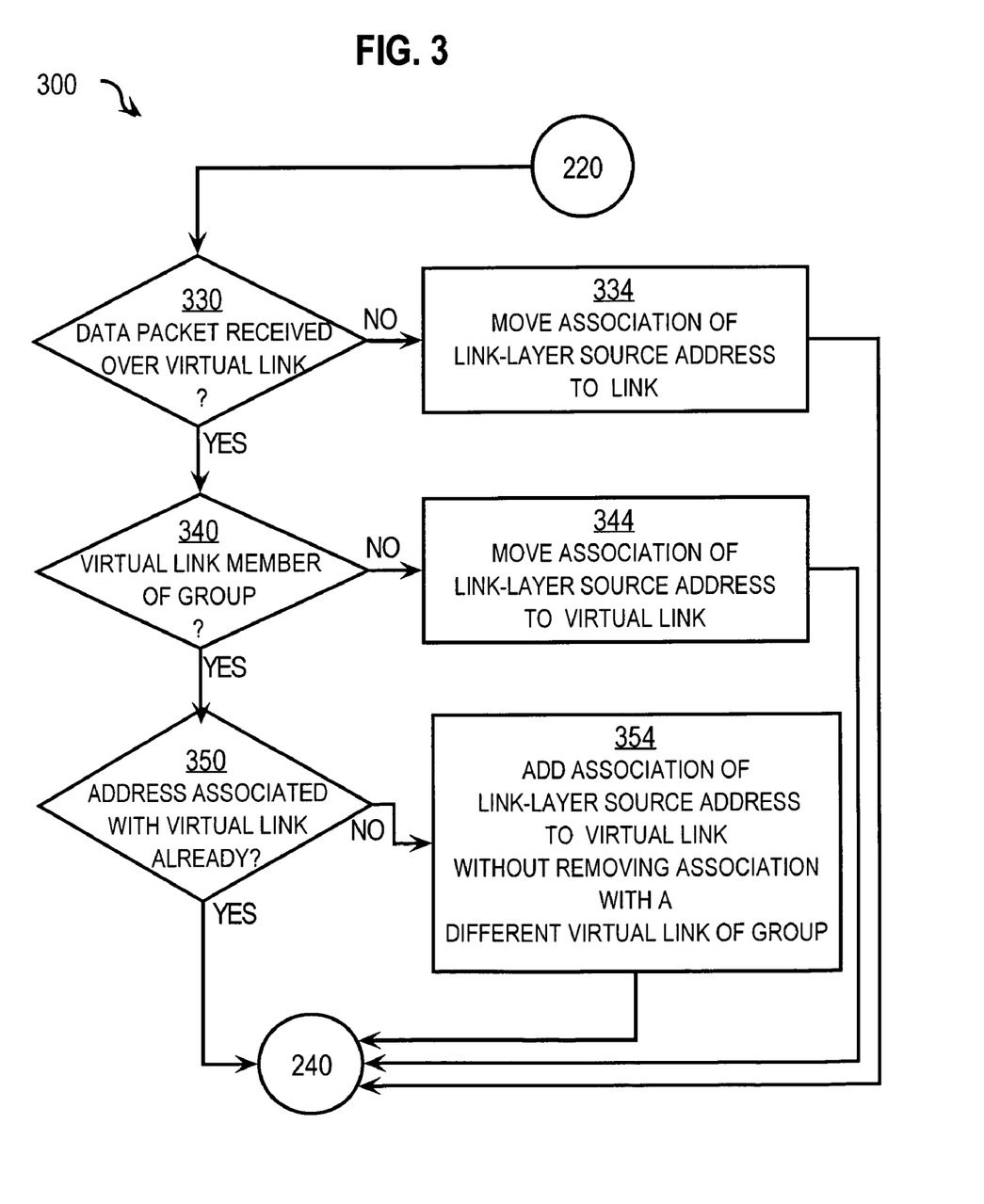
FIG. 3 is a flow diagram that illustrates a step of the method of FIG. 2, according to an embodiment.

FIG. 3 is a flow diagram that illustrates step 230 of the method of FIG. 2, according to an embodiment 300. Method 300 is an embodiment of step 230. Control passes to method 300 from step 220 and passes after method 300 to step 240. In step 220 a data packet is received.

In step 330, it is determined whether the data packet was received over a virtual link. Any method may be used to determine whether the packet was received over a virtual link. For example, in some embodiments a virtual link identifier is included in field 137 of a point-to-point protocol header 132 of the data packet 130. If the point-to-point header 132 is missing or the virtual link identifier field 137 is empty, it is determined that the data packet is not received over a virtual link.

If it is determined in step 330, that the data packet is not received over a virtual link, then control passes to step 334. In step 334, the data-link source address (e.g., the MAC source address) is stored in association with the port through which the data packet was received by storing the MAC source address in a MAC list field 417 in the physical link record 410 for that port. If the same MAC address is already associated with a different physical port (e.g., in field 427 of record 420), the association with the different physical port is eliminated (e.g., the MAC address is deleted from MAC list field 427), and the MAC address is said to be moved to the physical port where the more recent data packet was received. Control then passes to step 240.

If it is determined in step 330, that the data packet is received over a virtual link, then control passes to step 340. In step 340, it is determined whether the virtual link is a member of group bundled for load balancing. Any method may be used to determine whether the virtual link is a member of group bundled for load balancing. For example, it is determined whether a virtual link found in data link ID field 412 is associated with a virtual link group field 414 that holds data that indicates a group (e.g., Group X).

If it is determined in step 340, that the virtual link is not a member of a group bundled for load balancing, then control passes to step 344. In step 344, the data-link source address (e.g., the MAC source address) is stored in association with the virtual link of the data packet by storing the MAC source address in a MAC list field 416 (e.g., field 424*a*) associated with the virtual link ID field 412 (e.g., field 422*a*) that holds data that indicates that virtual link. If the same MAC address is already associated with a different virtual link (e.g., in field 426*b*), the association with the different virtual link is eliminated (e.g., the MAC address is deleted from MAC list field 426*b*), and the MAC address is said to be moved to the virtual link where the more recent data packet was received. Control then passes to step 240.

If it is determined in step 340, that the virtual link is a member of a group bundled for load balancing, then control passes to step 350. In step 350, it is determined whether the data link source address (e.g., the MAC source address) is already associated with the virtual link. Any method may be used to determine whether the MAC address is already associated with the virtual link. For example, it is determined whether the MAC address is included in a virtual link MAC list field 416 that is associated with the virtual link ID field 412 that holds data that indicates the virtual link of the current data packet. For example, it is determined whether the MAC address A is in the MAC list field 416*a* associated with virtual link ID field 412*a* that holds data that indicates virtual link 116*a*.

If it is determined in step 350, that the source address is not already associated with the virtual link, then control passes to step 354. In step 354, the data-link source address (e.g., the MAC source address) is stored in association with the virtual link of the data packet by storing the MAC source address in a MAC list field 416 (e.g., field 414*a*) associated with the virtual link ID field 412 (e.g., field 412*a*) that holds data that indicates that virtual link. If the same MAC address is already associated with a different virtual link (e.g., in field 416*b*), the association with the different virtual link is not eliminated (e.g., the MAC address is not deleted from MAC list field 416*b*). Unlike the prior art approaches, the same MAC source address may be associated with multiple virtual links. The same Mac address is expected to eventually appear in association with all virtual links in the same group. For example, MAC address A is expected to eventually be listed in both fields 416*a*, 416*b* associated with virtual links 116*a*, 116*b* indicated by data stored in fields 412*a*, 412*b*, respectively. Control then passes to step 240.

If it is determined in step 350, that the source address is already associated with the virtual link, then control passes directly to step 240. There is no need to add the MAC address to the list for this virtual link.

Using these methods, the multiple virtual links that all reach the same destination data-link layer address, even across different provider edge nodes of a matched set, are known and network traffic load is balanced across all those virtual links.

4.0 Implementation Mechanisms—Hardware Overview

Figure 5:
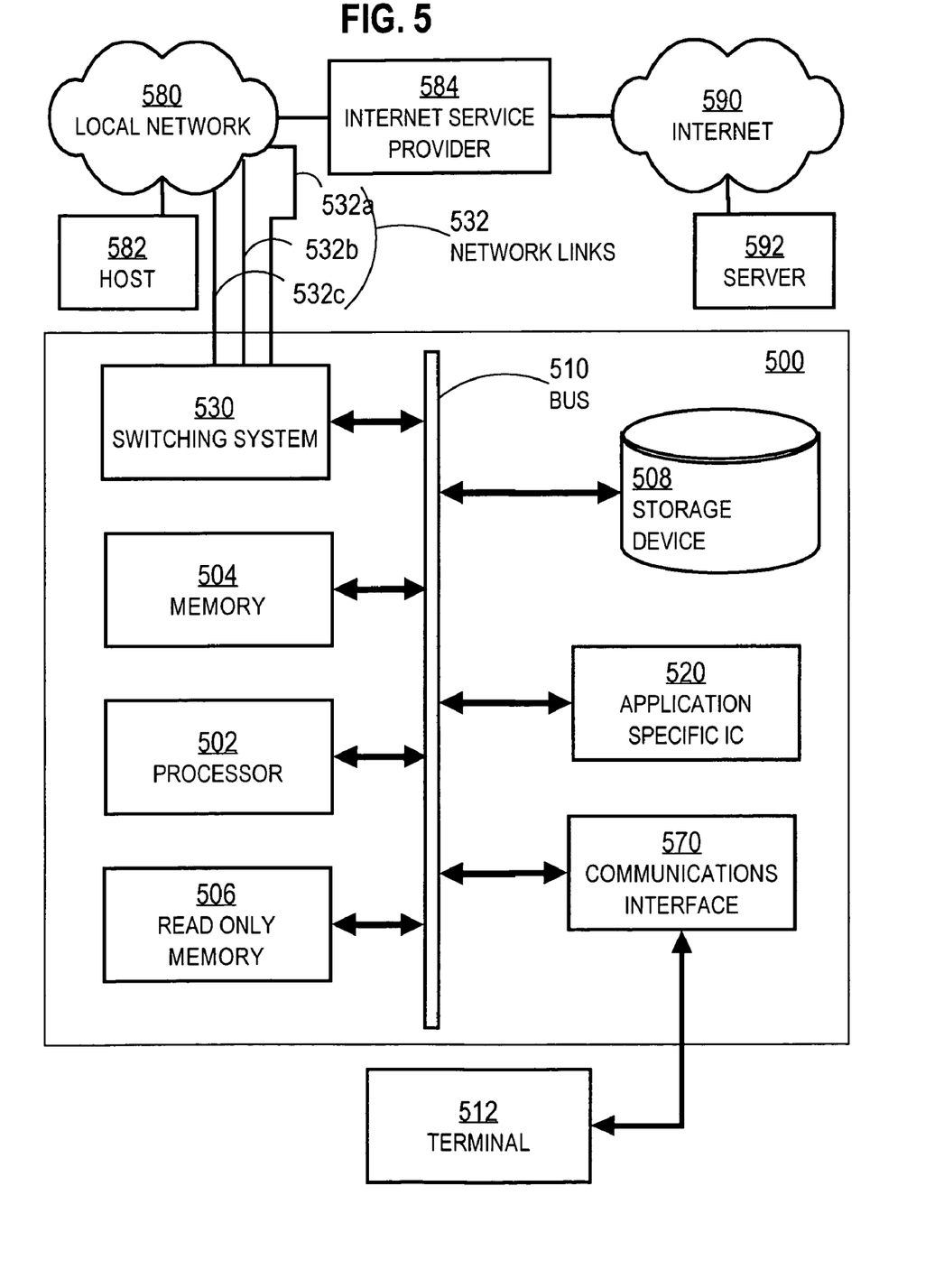
FIG. 5 is a block diagram that illustrates a router upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH- EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for load balancing network traffic over virtual point-to-point data links, comprising the steps of:
    determining a particular plurality of virtual point-to-point data links at a data-link layer, wherein the particular plurality of virtual point-to-point data links traverses a single virtual private network and reaches a particular local area network of one or more network nodes;
    associating a particular data-link address for a particular node of the particular local area network with each virtual point-to-point data link of the particular plurality of virtual point-to-point data links;
    receiving a plurality of data packets that each includes data that indicates the particular data-link address as a destination;
    determining a first virtual point-to-point data link of the particular plurality of virtual point-to-point data links for a first data packet of the plurality of data packets, and a different second virtual point-to-point data link of the particular plurality of virtual point-to-point data links for a different second data packet of the plurality of data packets to balance traffic among the particular plurality of virtual point-to-point data links; and
    sending the first data packet only over the first virtual point-to-point data link and the second data packet only over the second virtual point-to-point link.

2. A method as recited in claim 1, wherein the particular plurality of virtual point-to-point data links are included in a virtual local area network (VLAN).

3. A method as recited in claim 1, said step of determining the particular plurality of virtual point-to-point data links that reaches the particular local area network further comprising receiving configuration data that indicates the particular plurality of virtual point-to-point data links is a bundle for load-balancing.

4. A method as recited in claim 1, said step of determining the particular plurality of virtual point-to-point data links that reaches the particular local area network further comprising receiving over a virtual point-to-point data link of the particular plurality of virtual point-to-point data links a control plane data packet that includes data that indicates a unique identifier for the particular plurality of virtual point-to-point data links.

5. A method as recited in claim 1, said step of associating a particular data-link address for the particular node with each virtual point-to-point data link further comprising the steps of:
    receiving a data packet that includes data that indicates a first virtual point-to-point data link and a first data-link address as a source of the data packet;
    determining whether the first virtual point-to-point data link is among the particular plurality of virtual point-to-point data links; and
    if it is determined that the first virtual point-to-point data link is among the particular plurality of virtual point-to-point data links, then performing the steps of
        determining whether the first data-link address is associated with the first virtual point-to-point data link; and
        if it is determined that the first data-link address is not associated with the first virtual point-to-point data link, then associating the first data-link address with the first virtual point-to-point data link without removing an association of the first data-link address with any other virtual point-to-point data links of the particular plurality of virtual point-to-point data links.

6. A method as recited in claim 5, said step of associating a particular data-link address for the particular node with each virtual point-to-point data link further comprising the steps of:
    if it is determined that the first virtual point-to-point data link is not among the particular plurality of virtual point-to-point data links, then performing the steps of
        determining whether the first data-link address is associated with the first virtual point-to-point data link; and
        if it is determined that the first data-link address is not associated with the first virtual point-to-point data link, then performing the steps of:
            associating the first data-link address with the first virtual point-to-point data link,
            determining whether the first data-link address is associated with an other virtual point-to-point data link; and
            if it is determined that the first data-link address is associated with the other virtual point-to-point data link, removing the first data-link address from association with the other virtual point-to-point data link.

7. A method as recited in claim 1, wherein a virtual point-to-point data link of the particular plurality of virtual point-to-point data links is encapsulated in a loop-free network protocol for transecting a plurality of data-link layer switches.

8. A method as recited in claim 7, wherein the loop-free network protocol is a resilient packet ring (RPR) protocol.

9. A method as recited in claim 7, wherein the loop-free network protocol is a multiple protocol label switching (MPLS) protocol.

10. A method as recited in claim 7, wherein the loop-free network protocol is a media access control (MAC)-in-MAC protocol.

11. A method as recited in claim 7, wherein the loop-free network protocol is a generic routing encapsulation (GRE) tunneling protocol.

12. An apparatus for load balancing network traffic over virtual point-to-point data links, comprising:
means for determining a particular plurality of virtual point-to-point data links at a data-link layer, wherein the particular plurality of virtual point-to-point data links traverses a single virtual private network and reaches a particular local area network of one or more network nodes;
means for associating a particular data-link address for a particular node of the particular local area network with each virtual point-to-point data link of the particular plurality of virtual point-to-point data links;
means for receiving a plurality of data packets that each includes data that indicates the particular data-link address as a destination;
means for determining a first virtual point-to-point data link of the particular plurality of virtual point-to-point data links for a first data packet of the plurality of data packets, and a different second virtual point-to-point data link of the particular plurality of virtual point-to-point data links for a different second data packet of the plurality of data packets to balance traffic among the particular plurality of virtual point-to-point data links; and
means for sending the first data packet only over the first virtual point-to-point data link and the second data packet only over the second virtual point-to-point link.

13. An apparatus for load balancing network traffic over virtual point-to-point data links, comprising:
a network interface coupled to a network for communicating therewith a data packet;
a computer-readable medium for storing information;
one or more processors; and
one or more sequences of instructions stored on the computer-readable medium, which, when executed by the one or more processors, causes the one or more processors to carry out the steps of:
determining a particular plurality of virtual point-to-point data links at a data-link layer, wherein the particular plurality of virtual point-to-point data links traverses a single virtual private network and reaches a particular local area network of one or more network nodes through the network interface;
associating a particular data-link address for a particular node of the particular local area network with each virtual point-to-point data link of the particular plurality of virtual point-to-point data links;
receiving a plurality of data packets that each includes data that indicates the particular data-link address as a destination;
determining a first virtual point-to-point data link of the particular plurality of virtual point-to-point data links for a first data packet of the plurality of data packets, and a different second virtual point-to-point data link of the particular plurality of virtual point-to-point data links for a different second data packet of the plurality of data packets to balance traffic among the particular plurality of virtual point-to-point data links; and
sending the first data packet only over the first virtual point-to-point data link and the second data packet only over the second virtual point-to-point link.

14. An apparatus as recited in claim 13, wherein the particular plurality of virtual point-to-point data links are included in a virtual local area network (VLAN).

15. An apparatus as recited in claim 13, said step of determining the particular plurality of virtual point-to-point data links that reaches the particular local area network further comprising receiving configuration data that indicates the particular plurality of virtual point-to-point data links is a bundle for load-balancing.

16. An apparatus as recited in claim 13, said step of determining the particular plurality of virtual point-to-point data links that reaches the particular local area network further comprising receiving over a virtual point-to-point data link of the particular plurality of virtual point-to-point data links a control plane data packet that includes data that indicates a unique identifier for the particular plurality of virtual point-to-point data links.

17. An apparatus as recited in claim 13, said step of associating a particular data-link address for the particular node with each virtual point-to-point data link further comprising the steps of:
receiving a data packet that includes data that indicates a first virtual point-to-point data link and a first data-link address as a source of the data packet;
determining whether the first virtual point-to-point data link is among the particular plurality of virtual point-to-point data links; and
if it is determined that the first virtual point-to-point data link is among the particular plurality of virtual point-to-point data links, then performing the steps of
determining whether the first data-link address is associated with the first virtual point-to-point data link; and
if it is determined that the first data-link address is not associated with the first virtual point-to-point data link, then associating the first data-link address with the first virtual point-to-point data link without removing an association of the first data-link address with any other virtual point-to-point data links of the particular plurality of virtual point-to-point data links.

18. An apparatus as recited in claim 17, said step of associating a particular data-link address for the particular node with each virtual point-to-point data link further comprising the steps of:
if it is determined that the first virtual point-to-point data link is not among the particular plurality of virtual point-to-point data links, then performing the steps of
determining whether the first data-link address is associated with the first virtual point-to-point data link; and
if it is determined that the first data-link address is not associated with the first virtual point-to-point data link, then performing the steps of:
associating the first data-link address with the first virtual point-to-point data link,
determining whether the first data-link address is associated with an other virtual point-to-point data link; and
if it is determined that the first data-link address is associated with the other virtual point-to-point data link, removing the first data-link address from association with the other virtual point-to-point data link.

19. An apparatus as recited in claim 13, wherein a virtual point-to-point data link of the particular plurality of virtual point-to-point data links is encapsulated in a loop-free network protocol for transecting a plurality of data-link layer switches.

20. An apparatus as recited in claim 19, wherein the loop-free network protocol is a resilient packet ring (RPR) protocol.

21. An apparatus as recited in claim 19, wherein the loop-free network protocol is a multiple protocol label switching (MPLS) protocol.

22. An apparatus as recited in claim 19, wherein the loop-free network protocol is a media access control (MAC)-in-MAC protocol.

23. An apparatus as recited in claim 19, wherein the loop-free network protocol is a generic routing encapsulation (GRE) tunneling protocol.

* * * * *